US009758657B2

(12) United States Patent
Rohrmann et al.

(10) Patent No.: US 9,758,657 B2
(45) Date of Patent: Sep. 12, 2017

(54) MINERAL-FILLED POLYPROPYLENE COMPOSITION

(71) Applicant: Basell Polyolefine Italia S.r.l., Milan (IT)

(72) Inventors: Jurgen Rohrmann, Kelkheim (DE); Erik Hans Licht, Mainz (DE); Holger Ahrenberg, Bayreuth (DE)

(73) Assignee: Basell Poliolefine Italia S.r.l., Milan (IT)

( * ) Notice: Subject to any disclaimer, the term of this patent is extended or adjusted under 35 U.S.C. 154(b) by 7 days.

(21) Appl. No.: 14/775,488

(22) PCT Filed: Mar. 10, 2014

(86) PCT No.: PCT/EP2014/054574
§ 371 (c)(1),
(2) Date: Sep. 11, 2015

(87) PCT Pub. No.: WO2014/146923
PCT Pub. Date: Sep. 25, 2014

(65) Prior Publication Data
US 2016/0024287 A1    Jan. 28, 2016

(30) Foreign Application Priority Data
Mar. 19, 2013 (EP) .................... 13159844

(51) Int. Cl.
C08L 23/14    (2006.01)
C08J 5/00     (2006.01)
C08L 23/10    (2006.01)

(52) U.S. Cl.
CPC ............... *C08L 23/14* (2013.01); *C08J 5/00* (2013.01); *C08L 23/10* (2013.01); *C08J 2323/14* (2013.01); *C08J 2423/06* (2013.01); *C08J 2423/08* (2013.01); *C08J 2423/12* (2013.01); *C08L 2205/02* (2013.01); *C08L 2205/03* (2013.01); *C08L 2205/035* (2013.01); *C08L 2207/02* (2013.01); *C08L 2207/04* (2013.01)

(58) Field of Classification Search
CPC .. C08L 23/14; C08L 2207/04; C08L 2207/02; C08L 2205/03; C08L 2205/035; C08L 23/10; C08L 23/0815; C08J 5/00; C08J 2423/14; C08J 2423/12; C08J 2423/08; C08J 2423/06; C08J 2323/14
USPC ........................................ 524/451
See application file for complete search history.

(56) References Cited

U.S. PATENT DOCUMENTS

| 6,034,165 A * | 3/2000 | Tomomatsu ............ C08L 23/10 524/451 |
| 2009/0030098 A1* | 1/2009 | Cagnani .................... C08J 9/14 521/134 |
| 2010/0234513 A1* | 9/2010 | Milesi ...................... C08K 3/36 524/447 |
| 2012/0095154 A1 | 4/2012 | Bernreitner et al. |
| 2012/0108728 A1 | 5/2012 | Tranninger |
| 2013/0012642 A1 | 1/2013 | Mecklenburg et al. |

FOREIGN PATENT DOCUMENTS

| WO | WO-2010115878 A1 | 10/2010 |
| WO | WO-2010142540 A1 | 12/2010 |
| WO | WO-2011117032 A1 | 9/2011 |
| WO | WO-2011128305 A1 | 10/2011 |

OTHER PUBLICATIONS

Pot International Search Report and the Written Opinon—Mailed Mar. 10, 2014 (Oct. 3, 2014) for Corresponding PCT/EP2014/054574.

* cited by examiner

Primary Examiner — Josephine Chang

(57) ABSTRACT

The present invention relates to low density polypropylene compositions for the production of molded articles, such as finished parts for the automotive industry.

7 Claims, No Drawings

MINERAL-FILLED POLYPROPYLENE COMPOSITION

This application is the U.S. National Phase of PCT International Application PCT/EP2014/054574, filed Mar. 10, 2014, claiming benefit of priority to European Patent Application No. 13159844.3, filed Mar. 19, 2013, the contents of which are incorporated herein by reference in its entirety.

FIELD OF THE INVENTION

The present invention relates to thermoplastic polypropylene compositions and filled compositions thereof comprising talc as a mineral filler, for use in the production of molded articles for interior trims and exterior parts having smooth surface, good processability and low density.

BACKGROUND OF THE INVENTION

Typically, articles having smooth, mold-imprinted surfaces are used in trim components for interior designs, e.g. in cars or airplanes, and external car parts. The Automotive industry imposes stringent requirements for finished parts. Low total carbon emission, low fogging and low odor with good scratch resistance are typical requirements for interior trim such as instrument panel, door panels and quarter panel trim that are typically injection molded. The exterior parts, including bumper assemblies and structural modules such as front end module carrier, typically require high performance filled compounds. Exterior trims like side protection trims, cowl grills, wheel arch liners and covering parts like rocker panels, body side mouldings or fender liners demand specific properties in combination with good surface appearance.

U.S. Pat. No. 6,441,094 discloses impact resistant polyolefin compositions comprising two polymer fractions with different Melt flow rate values (bimodal matrix) and a rubbery phase formed by an elastomeric copolymer of ethylene. The polyolefin composition in U.S. Pat. No. 6,441,094 present a unique Balance of processability and mechanical and optical properties and they are particularly suitable for injection molding parts.

Materials used for exterior and interior trims need to deliver flexibility combining properties like narrow gap tolerances, superior scratch resistance and good paint adhesion and processability.

Due to their free-flowing characteristics, different blends filled with talcum have been used in such applications hitherto. The potential of talcum-reinforced blends is limited for molding of rigid finished articles, such as car dashboards, due to their inherent low flexural stiffness. Recently low density materials keeping high mechanical performance are desired to match increasing demand for lightweight car-parts to increase fuel efficiency, without deteriorating safety, and performance. Talc filled compositions are known to provide increased stiffness performance with the increase of the filler amount at the expense of an increase of weight. Reducing talc brings normally to a reduction of stiffness that can be compensated increasing stiffness of the polymeric components, nonetheless this is normally at the expense of shrinkage and thus impacting negatively on the narrow gap tolerance in molds.

It would be desirable to avoid the disadvantages of the prior art to devise a new low density light weight composite material for molded articles retaining the advantages of the prior art blends, notably their excellent free-flowing properties and shrinkage and impact/stiffness balance.

The compositions of the invention are suitable for conventional molds with comparable "gap tolerance" and "tool shrinkage" as for higher density compositions known in the state of the art.

Thus, the inventive composition is a valuable drop-in solution in the automotive field by using existing moulds with economic advantage and security of supply.

SUMMARY OF THE INVENTION

Accordingly, an object of the present invention is a composition having density of lower than 1 g/cm$^3$ comprising:
(A) from 15 to 60%, preferably from 20 to 30%, by weight of one or more propylene-based components being selected from propylene homopolymers, propylene copolymers or combination thereof, such first propylene-based component having a flexural modulus determined in accordance with ISO 178 higher than 1500 MPa, preferably higher than 2000 MPa, and PI higher than 10, preferably higher than 13;
(B) from 20 to 50%, preferably from 35 to 45% by weight of a heterophasic propylene polymer having melt flow rate of from 10 to 20 g/10 min comprising:
(B1) from 50 to 90% by weight, preferably from 60 to 80% by weight, of a crystalline polypropylene, preferably having solubility in Xylene at room temperature lower than 5% wt of the component (B1), and further preferably having melt flow rate higher than 50 g/10 min;
(B2) from 10 to 50% by weight, preferably from 20 to 40% by weight, of a copolymer of ethylene with at least one $C_3$-$C_{10}$ alpha-olefin as comonomer, preferably with propylene as comonomer, such copolymer containing from 40 to 60% by weight, of ethylene, preferably having solubility in Xylene at room temperature (25° C.) higher than 70% wt of component (B2);
(D) from 5 to 25%, preferably from 10 to 20% by weight, of an ethylene-based plastomer or elastomer, having a hardness (Shore A, ASTM D-2240) value equal to or lower than 90 points, preferably equal to or lower than 85 points, more preferably equal to or lower than 80 points, density lower than 0.890 g/cm$^3$;
(E) from 0 to 20%, preferably from 1 to 15%, more preferably from 10 to 15% by weight of talc, preferably an high aspect ratio talc, preferably a talc having a lamelarity index equal to or higher than 2.8;
(C) from 0 to 10%, preferably from 1 to 10%, more preferably from 3 to 8% by weight of high-density polyethylene (HDPE).

The sum of the percentage amounts of the individual components of the composition is equal to 100 percent, preferably the composition is including typically from 0 to 10% wt of a premix of additives and pigments in conventional polymeric carrier (e.g. standard polypropylene homopolymers).

DETAILED DESCRIPTION OF THE INVENTION

The first propylene-based component (A) can suitably be a propylene homopolymer or copolymer containing up to 5% by weight of ethylene and optionally one or more $C_4$-$C_{10}$ alpha-olefin(s). Examples of $C_4$-$C_{10}$ alpha-olefins that may be used as comonomers include 1-butene, 1-pentene, 1-hexene, 4-methyl-1-pentene and 1-octene, with 1-butene being particularly preferred.

Preferably said component (A) has a MFR (230° C., 2.16 kg) value of from 10 to 150 g/10 min, more preferably from 20 to 50 g/10 min.

Also preferably, said component (A) has a content of xylene-soluble fraction at room temperature (25° C.) of less than 7% by weight, preferably of less than 5% by weight, even more preferably of less than 3% by weight.

Said component (A) can be obtained according to the process and in presence of a Ziegler Natta catalyst as described in EP0573862.

The component (B) can suitably be prepared by a sequential polymerization, comprising at least two sequential steps, wherein components (B1) and (B2) are prepared in separate subsequent steps, operating in each step in the presence of the polymer formed and the catalyst used in the preceding step. Component (B) is an heterophasic copolymer composed by a propylene polymer matrix and an ethylene-alphaolefin copolymer rubber, preferably an ethylene-propylene copolymer rubber component (EPR).

Within the second propylene-based component (B), the component (B1) preferably is a crystalline propylene homopolymer being for at least 98% by weight, insoluble in xylene at 25° C. The crystalline component (B1) preferably has a melt flow rate higher than 70 g/10 min.

Within the second propylene-based component (B), the component (B2) is preferably an ethylene propylene copolymer containing from 45 to 55% by weight of ethylene, being preferably at least 80% by weight soluble in xylene at room temperature (25° C.). Polymer compositions suitable as component (B) can be prepared with catalyst components such as the one disclosed in EP0728769 (example 5) with alkyl-alkoxysilanes as external donor. According to the present invention, it is neither necessary nor desired to crosslink the components (A) and (B) by vulcanization.

Typically, the ethylene-based plastomer (D) suitable for use in the compositions of the present invention is a copolymer of ethylene with a $C_3$-$C_{10}$ alpha-olefin containing at least 20 wt %, preferably from 20 to 50 wt %, of units derived from a $C_3$-$C_{10}$ alpha-olefin ($^{13}$C-NMR analysis).

The ethylene-based plastomer (D) has density lower than 0.89 g/cm$^3$ (measured according to ASTM D-792), preferably lower than 0.87 g/ml.

Preferred examples of ethylene-based plastomers (D) are:
copolymers of ethylene with 1-octene having from 20 wt % to 45 wt % of units derived from 1-octene ($^{13}$C-NMR analysis);
copolymers of ethylene with 1-butene having from 20 wt % to 40 wt % of units derived from 1-butene ($^{13}$C-NMR analysis).

Typically the talc (E) suitable for use in the compositions of the present invention is in particle form having an average particle size (Sedigraph ISO 13317-3) ranging from (D50) 0.1 to 20 micrometers (μm). Particularly preferred for use in the composition of the present invention is an high aspect ratio talc having a lamellarity index equal to or higher than 2.8. The lamellarity index characterizes the shape of the particle, and more particularly its flatness (large dimension/thickness). The lamellarity index may be measured by the difference between, on the one hand, the value of the mean dimension of the particles of the powder obtained by a particle size measurement by Malvern laser diffraction using a wet method (standard AFNOR NFX11-666) and on the other hand, the value of the mean diameter D50 obtained by a measurement by sedimentation using a "Sedigraph" (standard AFNOR X11-683), this difference being related to the mean diameter D50. Reference is made to the article "G.BAUDET and J. P. RONA, Ind. Min. Mines et Cam Les techn. June, July 1990, pp 55-61" which shows that this index is correlated to the mean ratio of the largest dimension of the particle to its smallest dimension. "High lamellarity" is understood to mean a powder of which the lamellarity index is high and in particular greater than 2.8, preferably equal to or higher than 4.

According to one embodiment, when the compositions of the present invention include component (C), that is is to say the compositions include an amount of high-density polyethylene (HDPE), they show a substantial improvement in their resistance to scratch.

The scratch resistance is also improved, according to another embodiment, by the incorporation of minor amounts of an anti-scratch additive. Anti-scratch additives that can be used in the compositions of the invention are all those known in the art as having a lubricating effect that leads to less scratch visibility. Examples of such compounds are erucamide, oleamide and polydimethylsiloxane.

The scratch resistance is improved, according to still another embodiment, by the incorporation of higher amounts of pigments.

The compositions of the present invention have preferably a density (ISO 1183) of lower than 0.99 g/cm$^3$ and a melt flow rate value (ISO 1133-230° C., 2.16 Kg) of from 5 to 150 g/10 min, preferably of from 10 to 50 g/10 min.

The compositions of the present invention can be prepared by mechanically mixing its components.

The compositions of the present invention suitably show flexural modulus (ISO 178) higher than 1000 MPa, preferably higher than 1200 MPa, more preferably higher than 1400 MPa. The compositions of the present invention also suitably show tensile modulus higher than 1000 MPa, preferably higher than 1200 MPa, more preferably higher than 1400 MPa.

Advantageously the compositions according to the present invention show improvement in standard "odor testing", high flowability of the polymeric components being obtained ex-reactor instead of via peroxide visbreaking.

The compositions of the present invention, due to the combination of properties high stiffness, high flowability and good impact behavior in addition providing also low density value are particularly suitable for molded articles such as finished parts for the automotive industry.

Accordingly, another object of the present invention is a molded article prepared from a composition according to the invention. Said molded articles, according to the present invention can be, for example, finished parts for the automotive industry, such as dashboards, instrument panels or other interior or exterior trim components for a car.

According to a further object, the present invention provides a vehicle, such as a car or a truck, comprising a molded article according to the invention.

The following examples are given to illustrate the present invention without any limiting purpose.

EXAMPLES

Measurement Methods

The characterization data for the propylene polymers and for the obtained films were obtained according to the following methods:

Density

Determined according to ISO 1183, where not differently specified.

Melt Flow Rate (MFR)

Determined according to ISO 1133 (230° C., 2.16 Kg), where not differently specified.

Polydispersity Index (PI)

Accounts for the molecular weight distribution of the polymer. To determine the PI value, the modulus separation at low modulus value, e.g. 500 Pa, is determined at a temperature of 200° C. by using a RMS-800 parallel plates rheometer model marketed by Rheometrics (USA), operating at an oscillation frequency which increases from 0.01 rad/second to 100 rad/second. From the modulus separation value, the PI can be derived using the following equation:

PI=54.6×(modulus separation)−1.76 wherein the modulus separation (MS) is defined as:
MS=(frequency at G'=500 Pa)/(frequency at G"=500 Pa)
wherein G' is the storage modulus and G" is the low modulus.

Flexural Modulus

Determined according to ISO method 178.

Tensile Modulus

Determined according to ISO 527/1+2

Charpy

Determined according to ISO 179/1eU and /1eA.

Scratch Resistance:

A Scratching device hard metal tip was used with defined geometry to create a scratched grid with defined velocity and contact force on a grained surface.

The scratch resistance was measured according to the PV 3952 2002 scratch method of Volkswagen AG Company on an Erichsen scratching device model 430; with a load of 10N; speed 1000 mm/min. The difference of brightness (dL) is measured with a colorimeter before and after scratching. Smaller difference of brightness (dL) values indicate better scratch behavior.

Xylene Solubles (XS)

Determined as follows: 2.5 g of polymer and 250 ml of xylene are introduced in a glass flask equipped with a refrigerator and a magnetical stirrer. The temperature is raised in 30 minutes up to the boiling point of the solvent. The so obtained clear solution is then kept under reflux and stirring for further 30 minutes. The closed flask is then kept in thermostatic water bath at 25° C. for 30 minutes. The so formed solid is filtered on quick filtering paper. 100 ml of the filtered liquid is poured in a previously weighed aluminium container, which is heated on a heating plate under nitrogen flow, to remove the solvent by evaporation. The container is then kept on an oven at 80° C. under vacuum until constant weight is obtained. The weight percentage of polymer soluble in xylene at room temperature is then calculated.

Hardness

Shore A measured on a compression moulded plaques (thickness of 4 mm) following the ISO 868.

Longitudinal (MD) and Transversal (TD) Mould Shrinkage According to the Following Internal Test Method measured after 24 h on plaques and a film gate over the whole width to ensure homogeneous flow and orientation of the melt. A plaque of 195×100×2.5 mm is moulded in an injection moulding machine "Demag 160" (where 160 stands for 160 tons of clamping force).

The injection conditions are:
melt temperature=210° C.;
Injection moulding pressure:=80 bar
mould temperature=30° C.;
injection time=11 seconds;
holding pressure=50 bar
holding time=30 seconds;
Cooling time=20 sec
Cycle time=76 s
screw speed=80 rpm (1/min).

The plaque is measured 24 hours after moulding (mould shrinkage) and after annealing 48 h at 80° C. (Total shrinkage), through calipers, and the shrinkage is given by:

$$\text{Longitudinal shrinkage } (MD) = \frac{195 - \text{read\_value}}{195} \times 100$$

$$\text{Transversal shrinkage } (TD) = \frac{100 - \text{read\_value}}{100} \times 100$$

wherein 195 is the length (in mm) of the plaque along the flow direction (MD), measured immediately after moulding; 100 is the length (in mm) of the plaque crosswise the flow direction (TD), measured immediately after moulding; the read_value is the plaque length in the relevant direction.

Coefficient of Linear Thermal Expansion (CLTE)—ASTM D696.

CLTE ($\alpha$) is calculated using the formula: $\alpha = \Delta L/(L_o \cdot \Delta T)$ where $\Delta L$ is the change in length of the specimen, Lo is the original length of the specimen, and $\Delta T$ is the temperature change during the test.

All compositions described in the examples were produced with a twin-screw extruder Krupp Werner & Pfleiderer/1973, ZSK 53, screw diameter: 2×53, 36D with a screw rotation speed of 150 rpm and a melt temperature of 230° C.

All compounds were injection moulded under the same processing conditions with a Battenfeld BA 1500/630 injection molding machine, melt temperature: 220° C., mold temperature: 35° C., injection pressure: 1500 bar.

Example 1 (Comparative)

Composition

The composition was built up with:

14% HECO6 a heterophasic propylene copolymer having MFR (ISO 1133-230° C., 2.16 Kg) of 2.2 g/10 min;

45% HECO5 a heterophasic propylene copolymer having MFR (ISO 1133-230° C., 2.16 Kg) of 11 g/10 min;

16% HECO4 a heterophasic propylene copolymer having MFR (ISO 1133-230° C., 2.16 Kg) of 11 g/10 min;

22% Talc Steamic T1CA from IMERYS (hydrated magnesium silicate, d50 (Sedigraph 5100)=2.0, lamellarity index=1.8);

3% Premix: 2.1% MP HF501N (flakes) homopolymer available from Lyondellbasell having density 0.9 g/cm$^3$, Melt flow rate (MFR) 10 g/10 min (230° C./2.16 Kg), Tensile Modulus 1550 MPa; 0.4% Crodamide VRX (Oleamide V); 0.2% Magnesiumoxid; 0.1% Ethanox 330 (Anti-oxidants 1330); Songnox 1680 (M.S. 168); 0.1% Raven PFEB (Black pigments).

The main properties of the propylene polymeric components and of the final composition are reported in table 1 and table 2.

Example 2

Composition

The composition was built up with:

- 20% PP1 A propylene homopolymer with very high PI (polydispersity index) of 15 having MFR (ISO 1133-230° C., 2.16 Kg) of 25 g/10 min; Flexural Modulus 2120 MPa;
- 20% TAFMER A-1050S Ethylene-1-butene copolymer elastomer, (trademark of Mitsui Chemicals, Inc.), Density: 0.864 g/cm$^3$, Melt flow rate: 1.4 g/10 minutes measured at 190° C. under a load of 2.16 kg, 1-Butene unit content: 31.8% by weight (18.9% by mol); hardness of 57 Shore A points;
- 45% HECO1 a heterophasic propylene copolymer having MFR (ISO 1133-230° C., 2.16 Kg) of 17.1 g/10 min; flex. mod 1020 MPa;
- 12% Talc Steamic T1 CA from IMERYS (hydrated magnesium silicate, d50 (Sedigraph 5100)=2.0, lamellarity index=1.8);
- 3% Premix: 2.1% MP HF501N (flakes); 0.4% Crodamide VRX (Oleamide V); 0.2% Magnesiumoxid; 0.1% Ethanox 330 (Anti-oxidants 1330); Songnox 1680 (M.S. 168); 0.1% Raven PFEB (Black pigments).

The main properties of the propylene polymeric components and of the final composition are reported in table 1 and table 2.

Example 3 (Comparative)

Composition

The composition was built up with:

- 6% HDPE1, a High Density Polyethylene (HDPE) having MFR (ISO 1133-190° C., 2.16 Kg) of 8 g/10 min; flexural modulus 1200 MPa;
- 29% HECO3, a heterophasic propylene copolymer having MFR (ISO 1133-230° C., 2.16 Kg) of 18 g/10 min; flex. mod 1650 MPa;
- 28% HECO2, a heterophasic propylene copolymer peroxide visbroken grade having MFR (ISO 1133-230° C., 2.16 Kg) of 72 g/10 min; flex. mod 1140 MPa;
- 10% TAFMER A-1050S Ethylene-1-butene copolymer elastomer, (trademark of Mitsui Chemicals, Inc.), Density: 0.864 g/cm$^3$, Melt flow rate: 1.4 g/10 minutes measured at 190° C. under a load of 2.16 kg, 1-Butene unit content: 31.8% by weight (18.9% by mol); hardness of 57 Shore A points;
- 20% TalcSteamic T1CA from IMERYS (hydrated magnesium silicate, d50 (Sedigraph 5100)=2.0, lamellarity index=1.8);
- 7% Premix: 2% Polydimethylsiloxan Masterbatch 50% in standard polypropylene homopolymer; 2% Black Masterbatch 40% Black; 0.4% Antioxidants B225; 0.1% Light stabilizer 3853 PE; 0.15% Magnesiumoxid; 0.1% EBS; 2.25% pigments and MP HF 501N The main properties of the polymeric components and of the final composition are reported in table 1 and table 2.

Example 4 (Comparative)

Composition

The composition was built up with:

- 6% HDPE1, a High Density Polyethylene (HDPE) having MFR (ISO 1133-190° C., 2.16 Kg) of 8 g/10 min; flexural modulus 1200 MPa;
- 62.5% HECO3, a heterophasic propylene copolymer having MFR (ISO 1133-230° C., 2.16 Kg) of 18 g/10 min; flex. mod 1650 MPa;
- 13% TAFMER A-1050S Ethylene-1-butene copolymer elastomer, (trademark of Mitsui Chemicals, Inc.), Density: 0.864 g/cm$^3$, Melt flow rate: 1.4 g/10 minutes measured at 190° C. under a load of 2.16 kg, 1-Butene unit content: 31.8% by weight (18.9% by mol); hardness of 57 Shore A points;
- 12% TalcSteamic T1CA from IMERYS (hydrated magnesium silicate, d50 (Sedigraph 5100)=2.0, lamellarity index=1.8);
- 6.5% Premix: 1.5% Polydimethylsiloxan Masterbatch 50% in PP 2% Black Masterbatch 40% Black; 0.4% Antioxidants B225; 0.1% Light stabilizer 3853 PE; 0.15% Magnesiumoxid; 0.1% EBS; 2.25% pigments and MP HF 501N.

Example 5

Composition

The composition was built up with:

- 6% HDPE1, a High Density Polyethylene (HDPE) having MFR (ISO 1133-190° C., 2.16 Kg) of 8 g/10 min; flexural modulus 1200 MPa;
- 40.5% HECO1 a heterophasic propylene copolymer having MFR (ISO 1133-230° C., 2.16 Kg) of 17.1 g/10 min; flex. mod 1020 MPa;
- 27% PP1 A propylene homopolymer with very high PI (polydispersity index) of 15 having MFR (ISO 1133-230° C., 2.16 Kg) of 25 g/10 min; Flexural Modulus 2120 MPa;
- 10% TAFMER A-1050S Ethylene-1-butene copolymer elastomer, (trademark of Mitsui Chemicals, Inc.), Density: 0.864 g/cm$^3$, Melt flow rate: 1.4 g/10 minutes measured at 190° C. under a load of 2.16 kg, 1-Butene unit content: 31.8% by weight (18.9% by mol); hardness of 57 Shore A points;
- 10% Talc LUZENAC HAR T84 from IMERYS (hydrated magnesium silicate, d50 (Sedigraph 5100)=2.0, lamellarity index=4.3);
- 6.5 Premix: 1.5% Polydimethylsiloxan Masterbatch 50% in PP; 2% Black Masterbatch 40% Black; 0.4% Antioxidants B225; 0.1% Light stabilizer 3853 PE; 0.15% Magnesiumoxid; 0.1% EBS; 2.25% pigments and MP HF 501N.

The main properties of the polymeric components of the composition are reported in table 1.

In table 2 components amounts and final properties of the compositions are reported.

TABLE 1

| Pilot run | matrix MFR matrix g/10' | PI | Rubber % split % wt | % weight C₂ in rubber % wt | Total MFR tot g/10' | Flexural Modulus MPa | Shrinkage Long./Trans. % |
|---|---|---|---|---|---|---|---|
| HDPE1 | 14 (190/2.16 = 8.0) | | 0 | | | (1200) | |
| HECO3 | 30 | 6 | 45 | 12 | 18 | 1650 | 1.50/1.51 |
| HECO2 | 28 | 3.8 | 47 | 20 | 72 | 1140 | — |
| HECO1 | 80-110 | 4.2 | 30 | 49 | 17.1 | 1020 | 1.24/1.40 |
| PP1 | 25 | 15 | 0 | — | 25 | 2120 | — |
| HECO4 | 170 | 3.25 | 49 | 15 | 100 | 1180 | — |
| HECO5 | 95 | 12 | 48.5 | 70 | 11 | 800 | 0.4/0.6 |
| HECO6 | 100 | 4.25 | 30/40 | 38* | 2.2 | 235 | 0.58/0.58 |

*average in rubber components

TABLE 2

| | | M % wt | R % wt | Example 2 | Example 1 (comp.) |
|---|---|---|---|---|---|
| | | Polymeric components | | | |
| C | HDPE1 | 100 | | | |
| | HECO6 | 30 | 70 | | 14.0 |
| | (2 rubber components) | | | | |
| | HECO5 | 51.5 | 48.5 | | 45.0 |
| | HECO4 | 51 | 49 | | 16.0 |
| B | HECO1 | 70 | 30 | 45.0 | |
| A | PP1 | 100 | | 24.0 | |
| D | TAFMER A-1050S | | 100 | 20.0 | |
| | | Premix and filler | | | |
| E | TALK LUZENAC HAR T84 | | | | |
| | TALK Steamic T1CA | | | 12.0 | 22.0 |
| | Premix | | | 7.0 | 3.0 |
| | | Properties | | | |
| M % wt | total matrix fraction referred to the sum of polymeric components | | | 62 | 47 |
| R % wt | total rubber fraction referred to the sum of polymeric components | | | 38 | 53 |
| | density/g/cm³ | | | 0.98 | 1.05 |
| | MFR (230° C./2.16 kg)/g/10' | | | 12 | 12 |
| | Flex. mod./Mpa | | | 1450 | 1450 |
| | Charpy not. 23° C./kJ/m² | | | 40 | 40 |
| | Charpy not. −30° C./kJ/m² | | | 8 | 6 |
| | paint quality (e.g. homogeneity) | | | very good | good |
| | scratch 10N Erichsen/dL | | | | |
| | Shrinkage long./trans./% | | | 0.46/0.78 | 0.45/0.77 |
| | CLTE | | | 0.65 | 0.65 |
| | surface quality (e.g. homogeneity of A surface, weld and flow line visibility) | | | very good | good |
| | process window (e.g. inj. pressure range) | | | high | good |

| | | M % | R % | Example 4 (comp) | Example 5 | Example 3 (comp.) |
|---|---|---|---|---|---|---|
| | | Polymeric components | | | | |
| C | HDPE1 | 100 | | 6.0 | 6.0 | 6.0 |
| | HECO3 | 55 | 45 | 62.5 | | 29.0 |
| | HECO2 | 52 | 47 | | | 28.0 |
| B | HECO1 | 70 | 30 | | 40.5 | |
| A | PP1 | 100 | | | 27.0 | |
| D | TAFMER A-1050S | | 100 | 13.0 | 10.0 | 10.0 |

TABLE 2-continued

| | | | | |
|---|---|---|---|---|
| | Premix and filler | | | |
| E | TALK LUZENAC HAR T84 | | 10.0 | |
| | TALK Steamic T1CA | 12.0 | | 20.0 |
| | Premix | 6.5 | 6.5 | 7.0 |
| | Properties | | | |
| M % | total matrix fraction referred to the sum of polymeric components | 50 | 74 | 50 |
| R % | total rubber fraction referred to the sum of polymeric components | 50 | 27 | 50 |
| | density/g/cm³ | 0.98 | 0.97 | 1.05 |
| | MFR 230° C./2.16 kg/g/10' | 12 | 15 | 17 |
| | Flex.mod./Mpa | 1650 | 1850 | 1850 |
| | Charpy not. 23° C./kJ/m2 | 30 | 35 | 35 |
| | Charpy not. −30° C./kJ/m2 | 4 | 4 | 4 |
| | scratch 10N Erichson/dL | 0.8 | 0.5 | 1.2 |
| | Shrinkage long./trans./% | 0.65/0.91 | 0.65/0.9 | 0.64/0.92 |
| | CLTE | 0.85 | 0.85 | 0.85 |
| | surface quality | Good | good | good |
| | process window | Good | good | good |

The HDPE component (C) has been considered contributing to the "matrix" while the TAFMER metallocene copolymer elastomer has been considered contributing to the "rubber" fractions of the compositions. From the data reported it is evident that the reduction of talc amount, in the compositions according to the invention, is possible maintaining impact and stiffness and without worsening the shrinkage.

Particularly comparative example 4 shows that reducing talc it is effective for reducing density but inevitably worsen stiffness (flexural modulus). Amount and type of polymeric components must be purposively selected according to the invention to preserve the desired balance of properties reducing talc.

What is claimed is:

1. A composition comprising:
   (A) 15-60% by weight of one or more propylene-based components being selected from propylene homopolymers, propylene copolymers or combinations thereof, comprising a flexural modulus (ISO 178) higher than 1500 MPa, a melt flow rate (MFR) of 20-50 g/10 min and a PI higher than 10;
   (B) 20-50% by weight of a heterophasic propylene polymer having a melt flow rate of 10-20 g/10 min comprising:
     (B1) 50-90% by weight of a crystalline polypropylene having a solubility in xylene at room temperature lower than 5% by weight of the component (B1) and an MFR higher than 50 g/10 min;
     (B2) 10-50% by weight of a copolymer of ethylene with at least one $C_3$-$C_{10}$ alpha-olefin as comonomer such copolymer containing 40-60% by weight of ethylene and having a xylene solubility at room temperature higher than 70% by weight;
   (D) 5-25% by weight of an ethylene-based plastomer or elastomer, having a hardness (Shore A, ASTM D-2240) value equal to or lower than 90 points, and a density lower than 0.890 g/cm³;
   (E) 10-15% by weight of talc; and
   (F) 3-8% by weight of high-density polyethylene (HDPE);
   wherein the composition comprises 1) a flexural modulus of greater than 1400 MPa; 2) a tensile modulus of greater than 1000 MPa: and 3) a density lower than 1 g/cm³; and a sum of the percentage amounts of components (A)-(F) equals 100%.

2. The composition of claim 1, wherein the flexural modulus determined in accordance with ISO 178 of the component (A) is higher than 2000 MPa and the PI of the component (A) is higher than 13.

3. The composition of claim 1, wherein the melt flow rate MFR (230° C., 2.16 kg) value of component (B1) is higher than 70 g/10 min.

4. The composition of claim 1, wherein component (E) has a high aspect ratio talc with lamellarity index equal to or higher than 2.8.

5. A molded article prepared from the composition of claim 1.

6. The molded article of claim 5, comprising a finished part for use in the automotive industry.

7. The molded article of claim 6, wherein the finished part is selected from the group consisting of a dashboard, an instrument panel, an interior trim component and an exterior trim component.

* * * * *

UNITED STATES PATENT AND TRADEMARK OFFICE
CERTIFICATE OF CORRECTION

PATENT NO. : 9,758,657 B2
APPLICATION NO. : 14/775488
DATED : September 12, 2017
INVENTOR(S) : Jurgen Rohrmann et al.

Page 1 of 1

It is certified that error appears in the above-identified patent and that said Letters Patent is hereby corrected as shown below:

On the Title Page

| | | |
|---|---|---|
| (56) | Line 1 | In Other Publications, delete "Pot" and insert --PCT-- |
| (56) | Line 1 | In Other Publications, delete "Opinon-Mailed" and insert --Opinion-Mailed-- |

In the Specification

| | | |
|---|---|---|
| Column 3 | Line 20 | Delete "ethylene-alphaolefin" and insert --ethylene-alpha-olefin-- |
| Column 4 | Line 3 | Delete "Cam" and insert --Carr.-- |
| Column 4 | Line 11 | Delete "is is" and insert --is-- |
| Column 7 | Line 22 | Delete "T1 CA" and insert --T1CA-- |

In the Claims

| | | |
|---|---|---|
| Column 12 | Line 33 | In Claim 1, delete "comprises" and insert --comprises:¶-- |
| Column 12 | Line 34 | In Claim 1, after "MPa;", insert --¶-- |
| Column 12 | Line 35 | In Claim 1, delete "MPa: and" and insert --MPa; and¶-- |
| Column 12 | Line 36 | In Claim 1, after "and", insert --¶-- |

Signed and Sealed this
Fourteenth Day of January, 2020

Andrei Iancu
*Director of the United States Patent and Trademark Office*